United States Patent
Zhou et al.

(10) Patent No.: US 12,547,220 B2
(45) Date of Patent: Feb. 10, 2026

(54) FOLDING MECHANISM AND FOLDING DISPLAY DEVICE

(71) Applicant: BOE TECHNOLOGY GROUP CO., LTD., Beijing (CN)

(72) Inventors: Pengfei Zhou, Beijing (CN); Linlin Xu, Beijing (CN); Song Zhang, Beijing (CN); Shangchieh Chu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 201 days.

(21) Appl. No.: 18/293,431

(22) PCT Filed: May 26, 2023

(86) PCT No.: PCT/CN2023/096486
§ 371 (c)(1),
(2) Date: Jan. 30, 2024

(87) PCT Pub. No.: WO2024/243726
PCT Pub. Date: Dec. 5, 2024

(65) Prior Publication Data
US 2025/0224777 A1    Jul. 10, 2025

(51) Int. Cl.
*G06F 1/16* (2006.01)
(52) U.S. Cl.
CPC .......... *G06F 1/1681* (2013.01); *G06F 1/1652* (2013.01)
(58) Field of Classification Search
CPC combination set(s) only.
See application file for complete search history.

(56) References Cited

U.S. PATENT DOCUMENTS

| | | | | |
|---|---|---|---|---|
| 11,009,919 | B2 * | 5/2021 | Hsu | F16C 11/04 |
| 11,953,950 | B2 * | 4/2024 | Kondo | G06F 1/1652 |
| 12,010,254 | B2 * | 6/2024 | Liu | H04M 1/022 |
| 12,256,508 | B2 * | 3/2025 | Zhang | G06F 1/1681 |
| 2014/0126121 | A1 | 5/2014 | Griffin et al. | |
| 2017/0328102 | A1 | 11/2017 | Kato | |
| 2019/0391618 | A1 * | 12/2019 | Hsu | G06F 1/1616 |
| 2021/0307186 | A1 * | 9/2021 | Hong | F16C 11/12 |
| 2022/0011828 | A1 * | 1/2022 | Zhan | G06F 1/1652 |

(Continued)

FOREIGN PATENT DOCUMENTS

| | | |
|---|---|---|
| CN | 111147637 A | 5/2020 |
| CN | 113067925 A | 7/2021 |

(Continued)

*Primary Examiner* — Lisa Lea-Edmonds
(74) *Attorney, Agent, or Firm* — The Webb Law Firm

(57) ABSTRACT

A folding mechanism includes: a first support member, a first rotating assembly and a first shaft sleeve. The first rotating assembly includes a first rotating shaft and a first rotating arm on the first rotating shaft. The first shaft sleeve has a first slit through inner and outer surfaces of the first shaft sleeve and both ends of the first shaft sleeve along a direction parallel to an axis of the first rotating shaft. The inner surface has a second limiting portion spaced apart from the first slit along a circumferential direction of the first shaft sleeve. An outer circumferential surface of the first rotating shaft has a first limiting portion used to: be engaged with the second limiting portion in a case of rotating to a first position, and be engaged with an inner end of the first slit in a case of rotating to a second position.

20 Claims, 8 Drawing Sheets

(56) References Cited

U.S. PATENT DOCUMENTS

| | | | | |
|---|---|---|---|---|
| 2022/0116489 | A1* | 4/2022 | Nagai | G06F 1/1652 |
| 2022/0365569 | A1* | 11/2022 | Hsu | F16C 11/04 |
| 2022/0377919 | A1 | 11/2022 | Zhang et al. | |
| 2023/0315161 | A1* | 10/2023 | Liu | H04M 1/022 |
| | | | | 361/191 |
| 2023/0421673 | A1* | 12/2023 | Huang | G06F 1/1681 |
| 2024/0036607 | A1* | 2/2024 | Yen | G06F 1/1681 |
| 2024/0094785 | A1* | 3/2024 | Cheng | H04M 1/022 |
| 2024/0215182 | A1* | 6/2024 | Zhang | G06F 1/1652 |
| 2024/0329696 | A1* | 10/2024 | Sun | G06F 1/1616 |
| 2024/0380829 | A1* | 11/2024 | Su | H04M 1/0235 |
| 2025/0053203 | A1* | 2/2025 | Nagai | H04M 1/022 |
| 2025/0056743 | A1* | 2/2025 | Zhang | G06F 1/1641 |
| 2025/0080631 | A1* | 3/2025 | Su | G06F 1/1652 |
| 2025/0224777 | A1* | 7/2025 | Zhou | G09F 9/30 |

FOREIGN PATENT DOCUMENTS

| | | |
|---|---|---|
| CN | 113194183 A | 7/2021 |
| CN | 113643612 A | 11/2021 |
| CN | 215110040 U | 12/2021 |
| CN | 114076144 A | 2/2022 |
| CN | 114125108 A | 3/2022 |
| CN | 114627760 A | 6/2022 |
| CN | 114876948 A | 8/2022 |
| CN | 113542456 B | 9/2022 |
| CN | 115182924 A | 10/2022 |
| CN | 115370655 A | 11/2022 |
| EP | 4131901 A1 | 2/2023 |
| TW | 1606774 B | 11/2017 |

\* cited by examiner

FOLDING MECHANISM AND FOLDING DISPLAY DEVICE

CROSS-REFERENCE TO RELATED APPLICATION

This application is the United States national phase of International Patent Application No. PCT/CN2023/096486 filed on May 26, 2023, the disclosure of which is hereby incorporated by reference in its entirety.

BACKGROUND OF THE INVENTION

Field of the Invention

The present disclosure relates to the field of display technologies, and in particular, to a folding mechanism and a folding display device.

Description of Related Art

Organic light-emitting diode (OLED) display devices have the advantages of bright colors, self-illumination, thinness, flexibility, etc. A flexible substrate may be used in an OLED display device to make the OLED display device foldable. However, as the screen size of the OLED display device increases, the folding torsion force of the OLED display device also needs to increase accordingly. How to increase the folding torsion force of the OLED display device has become a design problem.

SUMMARY OF THE INVENTION

In an aspect, a folding mechanism is provided. The folding mechanism includes: a first support member, a first rotating assembly and a first shaft sleeve. The first rotating assembly includes a first rotating shaft and a first rotating arm, and the first rotating arm is sleeved and fixed on the first rotating shaft. The first shaft sleeve is fixed on the first support member; a first shaft sleeve has a first slit, and the first slit runs through an inner surface of the first shaft sleeve and an outer surface of the first shaft sleeve and runs through both ends of the first shaft sleeve along a direction parallel to an axis of the first rotating shaft; and the inner surface of the first shaft sleeve has a second limiting portion, and the second limiting portion and the first slit are arranged spaced apart along a circumferential direction of the first shaft sleeve. An outer circumferential surface of the first rotating shaft has a first limiting portion, and the first limiting portion is used to: be engaged with the second limiting portion in a case of rotating to a first position, and be engaged with an inner end of the first slit in a case of rotating to a second position.

In some embodiments, the first rotating assembly is provided as two in number, and the two first rotating assemblies are arranged side by side along a first direction; and the first shaft sleeve is provided as two in number, and the two first shaft sleeves are arranged side by side along the first direction. The first direction intersects the axis of the first rotating shaft.

In some embodiments, two first rotating arms in the two first rotating assemblies each have a first tooth structure. The folding mechanism further includes M second shaft sleeves and M first gears meshed in sequence; the M first gears are meshed between first tooth structures of the two first rotating arms, and are rotatably sleeved in the M second shaft sleeves; and the M second shaft sleeves are fixed on the first support member. M is an even number greater than or equal to 2.

In some embodiments, the first rotating assembly further includes: a second support member, a first curved slideway and a first connecting member. The second support member is located on a side of the first support member along a first direction, the first direction intersecting the axis of the first rotating shaft; and the second support member is connected to the first rotating arm. The first curved slideway is located on the second support member; the first rotating arm has a first sliding portion, and the first sliding portion is slidably provided in the first curved slideway; the first connecting member has a linear slideway; and the first rotating arm further has a second sliding portion, and the second sliding portion is slidably provided in the linear slideway.

In some embodiments, the first rotating assembly further includes: a first curved block, fixed on the second support member. The first connecting member further has a second curved slideway, and the first curved block is slidably provided in the second curved slideway.

In some embodiments, the first rotating assembly further includes: a second connecting member; a first end of the second connecting member is rotatably connected to the first connecting member, and a second end of the second connecting member is rotatably connected to the first support member.

In some embodiments, a rotation axis of the second end of the second connecting member and the first support member is parallel to the axis of the first rotating shaft of the first rotating assembly.

In some embodiments, the folding mechanism further includes: two second rotating assemblies, arranged side by side along a first direction, the first direction intersecting the axis of the first rotating shaft; each second rotating assembly includes a second rotating shaft, a second rotating arm, and an elastic friction assembly; the second rotating arm is sleeved and fixed on the second rotating shaft, the elastic friction assembly is slidably sleeved on the second rotating shaft, and the axis of the first rotating shaft coincides with an axis of the second rotating shaft. The folding mechanism further includes a third connecting member; the third connecting member is slidably sleeved on second rotating shafts of the two second rotating assemblies, and located between the elastic friction assembly and the second rotating arm; a surface of the third connecting member facing a side where the second rotating arm is located has first protrusions, and a surface of the second rotating arm facing a side where the third connecting member is located has second protrusions. The first rotating arm and the second rotating arm are configured to rotate synchronously. In a case where the first rotating arm and the second rotating arm rotate to the first position, the first protrusions are staggered from the second protrusions; and in a case where the first rotating arm and the second rotating arm rotate to the second position, the first protrusions are in contact with the second protrusions to push the third connecting member to compress the elastic friction assembly.

In some embodiments, the second rotating arm includes a second rotating portion and at least one second installation portion, the second rotating portion is connected to the at least one second installation portions; and each second installation portion has a through hole, and the second rotating shaft is fixed and inserted through the through hole.

In some embodiments, the second rotating shaft has a third limiting portion; the elastic friction assembly has a first channel, and the first channel has a fourth limiting portion;

the third limiting portion is engaged with the fourth limiting portion to limit a relative rotation of the second rotating shaft to the elastic friction assembly.

In some embodiments, the elastic friction assembly includes: a locking member, a first friction member and at least one elastic member. The first friction member is closer to the third connecting member relative to the at least one elastic member, and the locking member is fixed on an end of the second rotating shaft away from the at least one elastic member.

In some embodiments, the folding mechanism further includes: a fourth connecting member; the fourth connecting member is rotatably sleeved on the second rotating shafts of the two second rotating assemblies, and is located between the third connecting member and the first friction member. The second rotating assembly further includes: a second friction member; the second friction member is sleeved and fixed on the second rotating shaft, and located between the third connecting member and the fourth connecting member.

In some embodiments, the folding mechanism further includes: a fixing member, rotatably sleeved on the second rotating shafts of the two second rotating assemblies and fixedly connected to the first support member; the fixing member has a third sliding portion, the second rotating arm has a third curved slideway, and the third sliding portion is slidably provided in the third curved slideway.

In some embodiments, the second rotating arm further has a second tooth structure. The folding mechanism further includes: N second gears meshed in sequence, and the N second gears are meshed between second tooth structures of two second rotating arms, and rotatably installed on the third connecting member and the fixing member. N is an even number greater than or equal to 2.

In some embodiments, the first limiting portion and the second limiting portion are both flat surface.

In another aspect, a folding mechanism is provided. The folding mechanism includes: a first support member, two second rotating assemblies and a third connecting member. The two second rotating assemblies are arranged side by side along a first direction; each second rotating assembly includes a second rotating shaft, a second rotating arm, and an elastic friction assembly. The second rotating arm is sleeved and fixed on the second rotating shaft, the elastic friction assembly is slidably sleeved on the second rotating shaft, and the first direction intersects an axis of the second rotating shaft. The third connecting member is slidably sleeved on second rotating shafts of the two second rotating assemblies, and located between the elastic friction assembly and the second rotating arm; a surface of the third connecting member facing a side where the second rotating arm is located has first protrusions, and a surface of the second rotating arm facing a side where the third connecting member is located has second protrusions. The first rotating arm and the second rotating arm are configured to rotate synchronously. In a case where the first rotating arm and the second rotating arm rotate to a first position, the first protrusions are staggered from the second protrusions; and in a case where the first rotating arm and the second rotating arm rotate to a second position, the first protrusions are in contact with the second protrusions to push the third connecting member to compress the elastic friction assembly.

In yet another aspect, a folding display device is provided. The folding display device includes: the above folding mechanism, a flexible screen and a connecting assembly. The folding mechanism is located on a back surface of the flexible screen; and the connecting assembly connects the flexible screen to the folding mechanism.

In some embodiments, the connecting assembly includes: a flexible fixing member and a fastening member. The flexible fixing member is located on a front surface of the flexible screen, and the flexible fixing member is located at an end of a folding axis of the flexible screen, and crosses the folding axis; and a portion of the flexible fixing member opposite to the folding axis is provided with a fixing portion. The fastening member includes a first connecting portion and a second connecting portion connected to each other; the first connecting portion is connected to the fixing portion, and the second connecting portion is connected to the first support member of the folding mechanism.

BRIEF DESCRIPTION OF THE DRAWINGS

In order to describe technical solutions in some embodiments of the present disclosure more clearly, the accompanying drawings to be used in some embodiments of the present disclosure will be introduced briefly; obviously, the accompanying drawings to be described below are merely some embodiments of the present disclosure, and a person of ordinary skill in the art can obtain other drawings according to those drawings. In addition, accompanying drawings in the following description may be regarded as schematic diagrams, and are not limitations on an actual size of a product, an actual process of a method and an actual timing of signals involved in the embodiments of the present disclosure.

DESCRIPTION OF THE INVENTION

Figure 1:
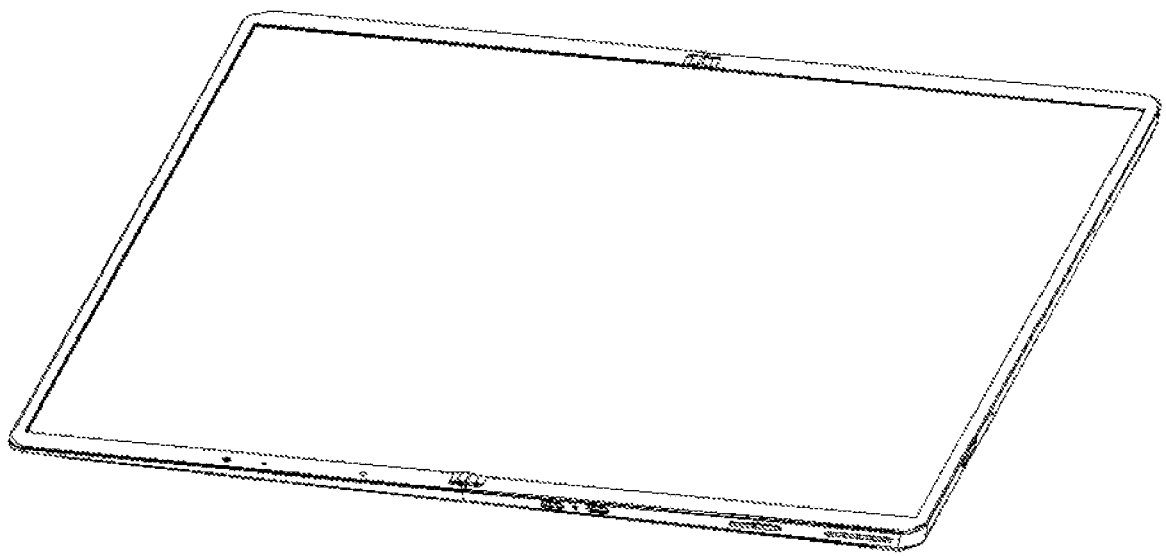
FIG. 1 is a structural diagram of a folding display device, in accordance with some embodiments.

The technical solutions in some embodiments of the present disclosure will be described clearly and completely with reference to the accompanying drawings; obviously, the described embodiments are merely some but not all embodiments of the present disclosure. All other embodiments obtained by a person of ordinary skill in the art based on embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

The terms "first" and "second" are used for descriptive purposes only, and are not to be construed as indicating or implying a relative importance or implicitly indicating a number of indicated technical features. Thus, features defined with "first" or "second" may explicitly or implicitly include one or more of the features. In the description of the embodiments of the present disclosure, the term "a plurality of" or "the plurality of" means two or more unless otherwise specified.

The phrase "A and/or B" includes the following three combinations: only A, only B, and a combination of A and B.

The term such as "parallel," "perpendicular," or "equal" as used herein includes a stated condition and a condition similar to the stated condition. A range of the similar condition is within an acceptable deviation range, and the acceptable deviation range is determined by a person of ordinary skill in the art, considering measurement in question and errors associated with measurement of a particular quantity (i.e., the limitations of a measurement system). For example, the term "parallel" includes absolute parallelism and approximate parallelism, and an acceptable range of deviation of the approximate parallelism may be a deviation within 5°; the term "perpendicular" includes absolute perpendicularity and approximate perpendicularity, and an acceptable range of deviation of the approximate perpendicularity may also be a deviation within 5°; and the term "equal" includes absolute equality and approximate equality, and an acceptable range of deviation of the approximate equality may be a difference between two equals being less than or equal to 5% of either of the two equals.

Some embodiments of the present disclosure provide a folding display device XS. The folding display device XS is a product having a function of displaying images (including still images or moving images, where the moving images may be a video). The folding display device XS may be by way of example a virtual reality (VR) display device or an augmented reality (AR) display device. The folding display device XS may also be by way of example a display, a cell phone (mobile phone), a tablet computer (Pad), a laptop computer, a television, a personal digital assistant (PDA), an ultra-mobile personal computer (UMPC), a netbook, a wearable device (e.g., a smartwatch), or an in-vehicle display device, and the embodiment do not limit the type of the folding display device XS.

Figure 2:
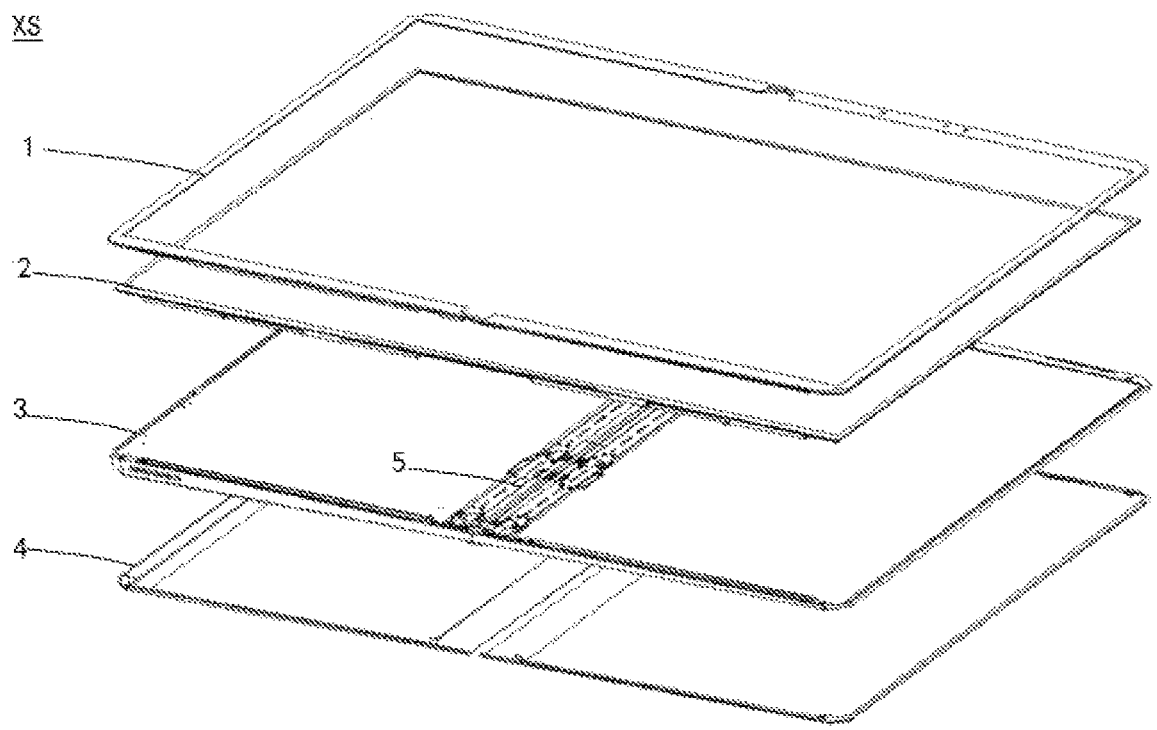
FIG. 2 is a structural diagram of a folding display device, in accordance with some embodiments.

The folding display device XS refers to a foldable display device. The folding display device XS has an unfolded state and a folded state. The folding display device XS as shown in FIG. 1 is in the unfolded state. Referring to FIG. 2, the folding display device XS includes a flexible screen 2, a folding mechanism 5 and two frame bodies 3. The flexible screen 2 is arranged on the two frame bodies 3 through the folding mechanism 5, so that the flexible screen 2 may be folded through the folding mechanism 5.

In some examples, referring to FIG. 2, the folding display device XS further includes two back covers 4 and two connected front frames 1. Each front frame 1 and each back cover 4 are fastened on two sides of the frame body 3, respectively (e.g., the upper side and the lower side as shown in FIG. 2). For example, the front frame 1 has a projecting first limiting member, and the frame body 3 may have a first limiting groove; the first limiting member is inserted into the first limiting member groove to assemble the front frame 1 and the frame body, and to further connect the front frame 1 and frame body 3. The front frame 1 has a projecting second limiting member, and the back cover 4 has a second limiting member groove; the second limiting member is inserted into the second limiting member groove to assemble the back cover 4 and the frame body 3, and to further connect the back cover 4 and the frame body 3.

Figure 3:
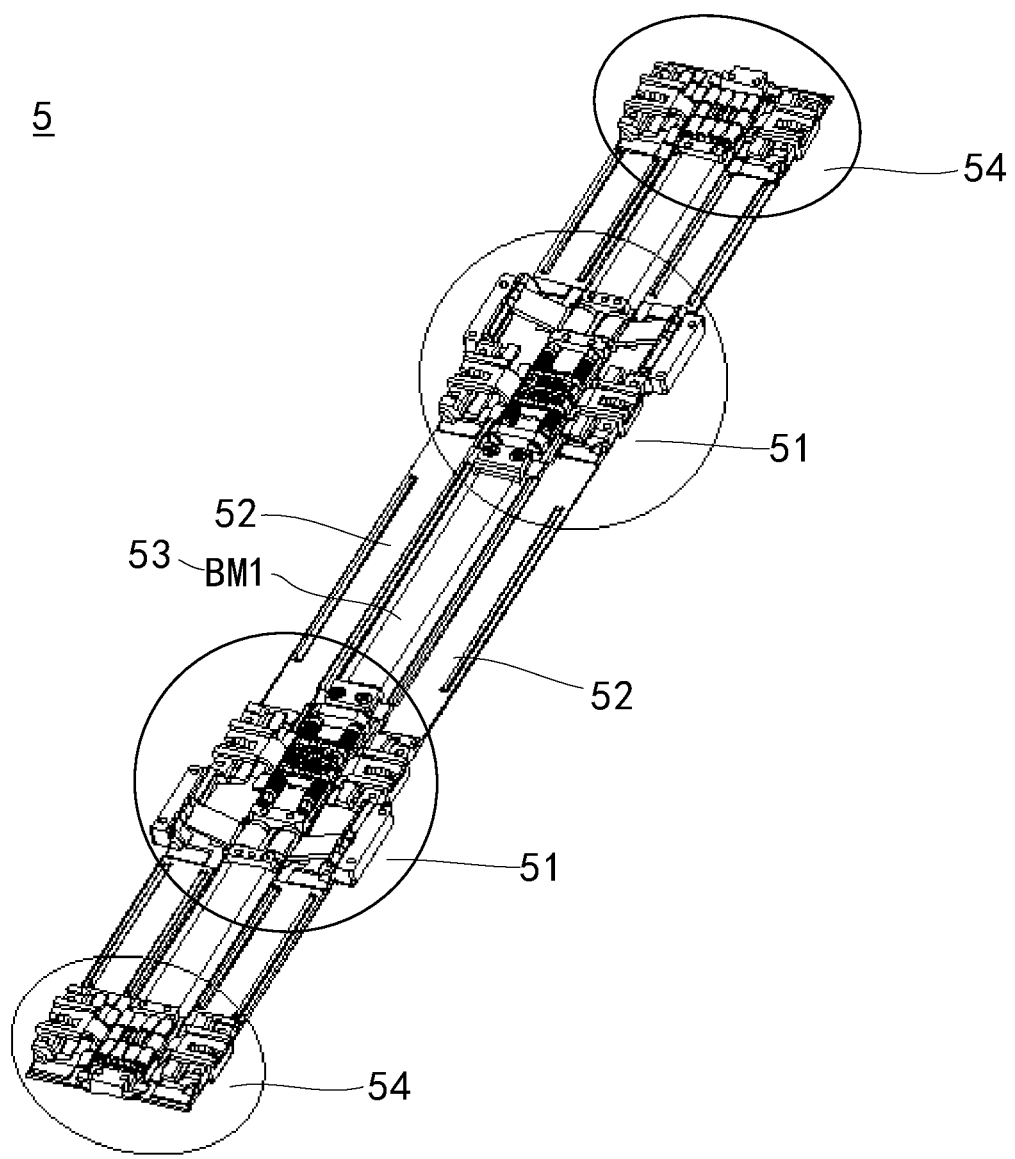
FIG. 3 is a structural diagram of a folding mechanism, in accordance with some embodiments.

Referring to FIG. 3, the folding mechanism 5 may include a first support member 53 and at least one (e.g., one or two) first folding mechanism 54. The first support member 53 has a first surface BM1 and a second surface (e.g., a back surface to the first surface BM1 illustrated in FIG. 3) opposite to each other. The first folding mechanism 54 is located on a side of the first surface BM1 away from the second surface, and is connected to the first support member 53. For example, the first folding mechanism 54 is provided on the first surface BM1 of the first support member 53. As another example, the first support member 53 has an installation opening for connection, and the first folding mechanism 54 is fixed in the installation opening.

In some examples, referring to FIG. 3, the folding mechanism 5 may further include a second support member 52. In some examples, the second support member 52 may be provided as one in number, and the second support member 52 is located on one side of the first support member 53. In some other examples, the second support member 52 may be provided as two in number, and the two second support members 52 are respectively located on both sides of the first support member 53 along a first direction. The description in the following is given as an example of a case where the second support member 52 is provided as two in number.

Referring to FIG. 3, the first support member 53 is located between the two second support members 52, and the first folding mechanism 54 is connected to the two second support members 52. Each first folding mechanism 54 can drive the two second support members 52 to rotate relative to the first support member 53. The folding mechanism 5 further includes at least one (e.g., one or two) second folding mechanism 51. The second folding mechanism 51 is connected to the first support member 53, and the second folding mechanism 51 is connected to the two second support members 52. Each second folding mechanism 51 can drive the two second support members 52 to rotate relative to the first support member 53. That is to say, the first folding mechanism 54 and the second folding mechanism 51 can simultaneously drive the two second support members 52 to rotate relative to the first support member 53. Here, the folding mechanism 5 as shown in FIG. 3 includes two second folding mechanisms 51 and two first folding mechanisms 54, and the two second folding mechanisms 51 are located between the two first folding mechanisms 54. Both the second support member 52 and the first support member 53 may be plate-like structures. The material of the first support member 53 may be carbon fiber. The material of the second support member 52 may be carbon fiber.

A folding display device includes a flexible display screen and a folding mechanism connected to each other, and the folding mechanism is used to fold the flexible display screen. As the size of the flexible display screen increases, torsion force of the folding mechanism also needs to increase to facilitate folding of the flexible display with the increased size. However, how to increase the torsion force of the folding mechanism becomes a design problem.

Figure 4:
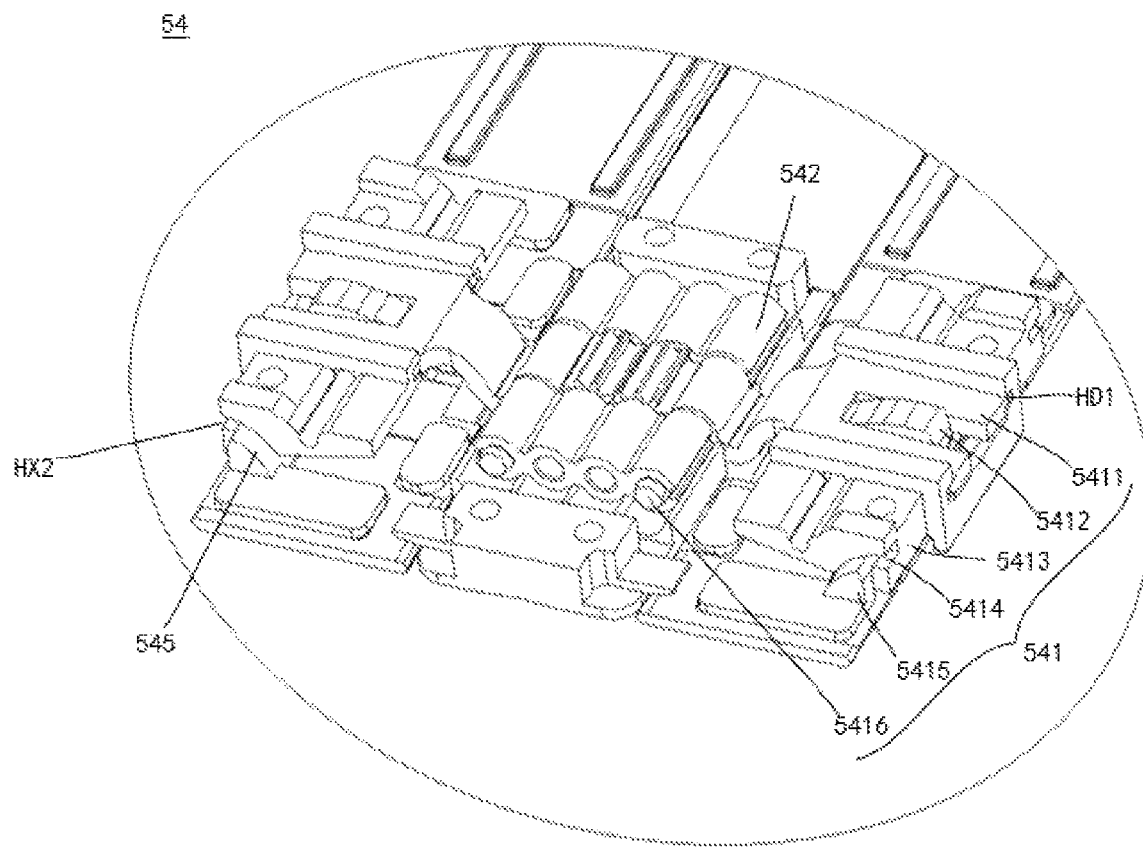
FIG. 4 to FIG. 6 are structural diagrams of a first folding mechanism, in accordance with some embodiments.
Figure 5:
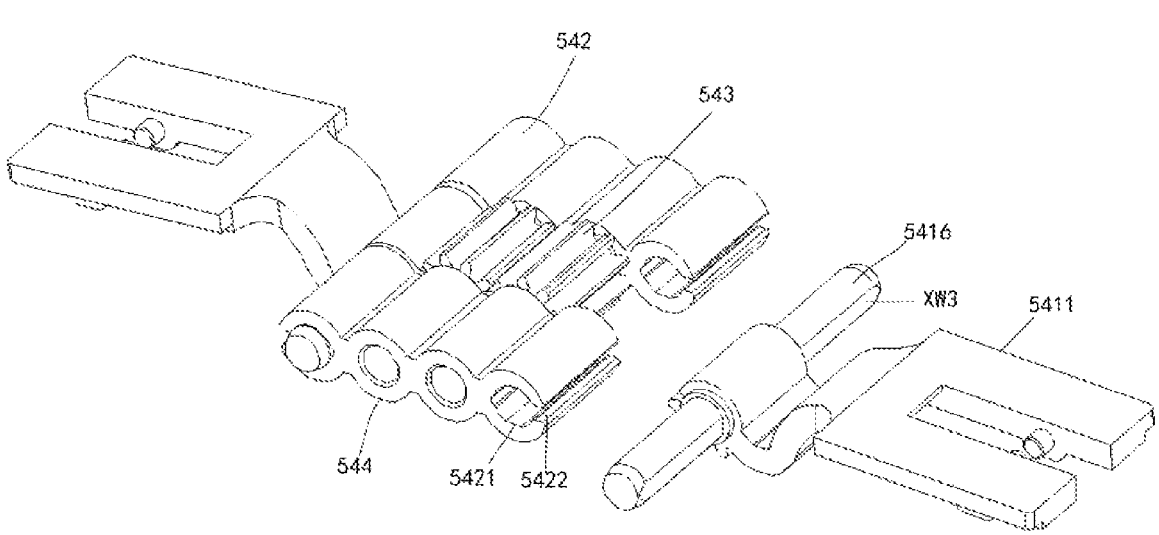
Figure 6:
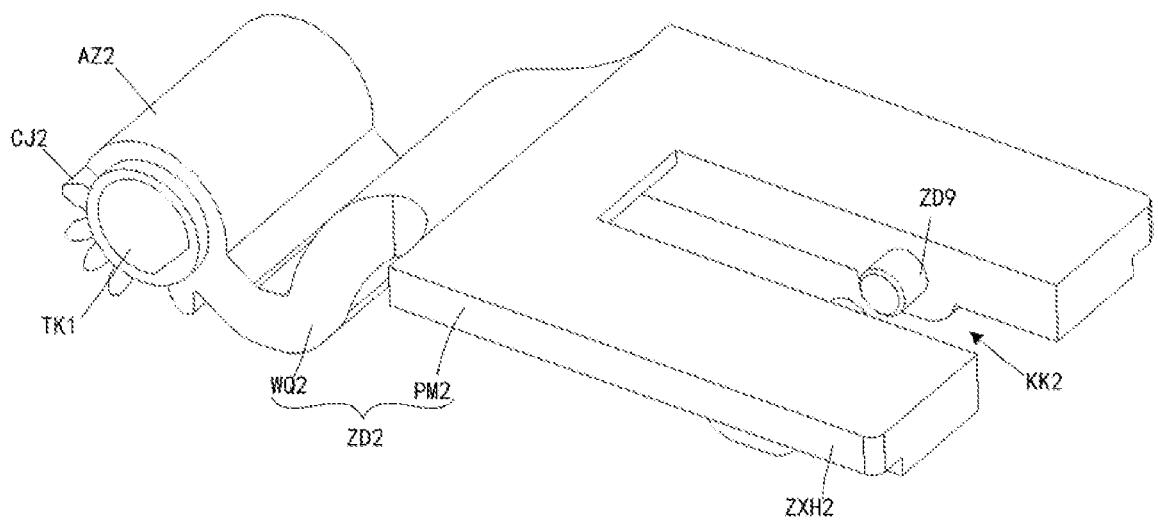

Referring to FIG. 4 to FIG. 6, the first folding mechanism 54 includes a first rotating assembly 541 and a first shaft sleeve 542. In some examples, the first rotating assembly

541 may be provided as one in number, and the first shaft sleeve 542 may be provided as one in number. In some other examples, the first rotating assembly 541 may be provided as two in number, and the first shaft sleeve 542 may be provided as two in number. The two first rotating assemblies 541 are arranged side by side along the first direction, and the two first shaft sleeves 542 are arranged side by side along the first direction. The description in the following is given as an example of a case where the first rotating assembly 541 is provided as two in number, and the first shaft sleeve 542 is provided as two in number.

Referring to FIG. 4 and FIG. 5, the first rotating assembly 541 includes a first rotating shaft 5416 and a first rotating arm 5411. The first rotating arm 5411 is sleeved and fixed on the first rotating shaft 5416. In a case where the first rotating arm 5411 rotates, the first rotating arm 5411 will drive the first rotating shaft 5416 to rotate. That is to say, the first rotating arm 5411 and the first rotating shaft 5416 rotate synchronously in the axis of the first rotating shaft 5416. Referring to FIG. 6, in some examples, the first rotating arm 5411 includes a first rotating portion ZD2 and a first installation portion AZ2 connected to each other; the first installation portion AZ2 has a first through hole TK1, and the first rotating shaft 5416 is fixed and inserted through the first through hole TK1 of the first installation portion AZ2. For example, the cross section of the first rotating shaft 5416 and the cross section of the first through hole TK1 are both "D" shaped. The first direction intersects (e.g., is perpendicular to) the axis of the first rotating shaft 5416.

Referring to FIG. 5, the outer circumferential surface of the first rotating shaft 5416 has a first limiting portion XW3. The inner surface of the first shaft sleeve 542 has a second limiting portion 5421. For example, the first shaft sleeve 542 has a second channel, and the second channel has the second limiting portion 5421. For example, the cross section of the first rotating shaft 5416 and the cross section of the second channel are both "D" shaped, and the first limiting portion XW3 and the second limiting portion 5421 may both be flat surfaces. That is, the cross sections of the first limiting portion XW3 and the second limiting portion 5421 may each be the straight portion in the "D" shape. In this case, the first limiting portion XW3 may be referred to as a first limiting surface, and the second limiting portion 5421 may be referred to as a second limiting surface.

Referring to FIG. 4 and FIG. 5, a first rotating shaft 5416 is rotatably sleeved in a first shaft sleeve 542, and two first shaft sleeves 542 are fixed on the first support member 53 (referring to FIG. 3). In this way, the first rotating arm 5411 can rotate in the first shaft sleeve 542 through the first rotating shaft 5416. When the first limiting portion XW3 is engaged with the second limiting portion 5421, the first rotating shaft 5416 is limited from rotating in the first shaft sleeve 542. The first rotating shaft 5416 and the first shaft sleeve 542 have an interference fit or a transition fit, reducing a gap between the first rotating shaft 5416 and the first shaft sleeve 542, and avoiding situations such as the first limiting portion XW3 and the second limiting portion XW3 shaking or rotating during engagement. Since the first rotating arm 5411 will drive the first rotating shaft 5416 to rotate, the first shaft sleeve 542 further has a first slit 5422 in order to allow the first rotating shaft 5416 to rotate in the first shaft sleeve 542. The first slit 5422 runs through an inner surface of the first shaft sleeve and an outer surface of the first shaft sleeve, and runs through both ends of the first shaft sleeve along a direction parallel to the axis of the first rotating shaft. In this way, when the first rotating shaft 5416 rotates from a position where the first limiting portion XW3 and the second limiting portion 5421 are engaged with each other to a position where the first limiting portion XW3 and the second limiting portion 5421 are staggered from each other, the first rotating shaft 5416 makes the first slit 5422 be expanded, and the width of the first slit 5422 becomes larger. In this case, the first rotating shaft 5416 and the first shaft sleeve 542, by way of example, change from having an interference fit to having a clearance fit. Thus, the first rotating shaft 5416 can rotate in the first shaft sleeve 542, thereby increasing friction force between the first rotating shaft 5416 and the first shaft sleeve 542. This friction force may increase the torsion force of the first folding mechanism, so that the first folding mechanism may be applied to folding display devices with various sizes (for example, less than or equal to 40 inches; as another example, greater than 40 inches). The inner end of the first slit 5422 can be understood as a virtual plane of the first slit 5422 proximate to the inner surface of the first shaft sleeve.

When the first rotating arm 5411 rotates to the first position, one of the inner end of the first slit 5422 and the second limiting portion 5421 is engaged with the first limiting portion XW3, which can be understood that one of the inner end of the first slit 5422 and the second limiting portion 5421 is in contact with the first limiting portion XW3, thereby realizing a self-locking of the first rotating shaft 5416 and the first shaft sleeve 542. When the first rotating arm 5411 rotates to the second position, the other one of the inner end of the first slit 5422 and the second limiting portion 5421 is engaged with the first limiting portion XW3, which can be understood that the other one of the inner end of the first slit 5422 and the second limiting portion 5421 is in contact with the first limiting portion XW3, thereby realizing the self-locking of the first rotating shaft 5416 and the first shaft sleeve 542 again. These two times of self-locking can enable the first folding mechanism to maintain an unfolded state and stabilize a folding state.

In some examples, when the first rotating arm 5411 rotates to the first position, the inner end of the first slit 5422 is in contact with the first limiting portion XW3; and when the first rotating arm 5411 rotates to the second position, the second limiting portion 5421 is in contact with the first limiting portion XW3. In some other examples, when the first rotating arm 5411 rotates to the first position, the second limiting portion 5421 is in contact with the first limiting portion XW3; and when the first rotating arm 5411 rotates to the second position, the inner end of the first slit 5422 is in contact with the first limiting portion XW3.

The first position may be one of a position when the first folding mechanism 54 is in the unfolded state and a position when the first folding mechanism 54 is in the folded state, and the second position may be the other of the position when the first folding mechanism 54 is in the unfolded state and the position when the first folding mechanism 54 is in the folded state. For example, the first position may be the position when the first folding mechanism 54 is in the unfolded state, and the second position may be the position when the first folding mechanism 54 is in the folded state. As another example, the second position may be the position when the first folding mechanism 54 is in the unfolded state, and the first position may be the position when the first folding mechanism 54 is in the folded state. The full text is described as an example of a case where the first position is the position when the first folding mechanism 54 is in the unfolded state, and the second position is the position when the first folding mechanism 54 is in the folded state.

Referring to FIG. 5, the second limiting portion 5421 and the first slit 5422 are arranged spaced apart along the circumferential direction of the first shaft sleeve 542. In some examples, a plane where the inner end of the first slit 5422 is located intersects a plane where the second limiting portion 5421 is located. For example, an angle included between the plane where the inner end of the first slit 5422 is located and the plane where the second limiting portion 5421 is located may be 30° to 90° (for example, 30°, 45°, 60°, 70°, 80°, or 90°). In some examples, the widths of the first slit 5422, the first limiting portion XW3, and the second limiting portion 5421 are all substantially equal.

For example, with continued reference to FIG. 4 to FIG. 6, the first rotating arm 5411 has a first tooth structure CJ2, and the first tooth structure CJ2 is composed of a plurality of gear teeth. The first folding mechanism 54 further includes M second shaft sleeves 544 and M first gears 543 meshed in sequence, where M is an even number greater than or equal to 2. The M first gears 543 are meshed between first tooth structures CJ2 of the two first rotating arms 5411. For example, among the M first gears 543, the first gear 543 closest to a first rotating arm 5411 is meshed with a first tooth structure CJ2 of the first rotating arm 5411. The M first gears 543 are rotatably sleeved in the M second shaft sleeves 544. For example, a first gear 543 is coaxially fixed on a first fixing shaft, and both ends of the first fixing shaft are rotatably provided in a second shaft sleeve 544. The rotation axes of the M first gears 543 are parallel to the axis of the first rotating shaft 5416. For example, the axis of the first fixing shaft is parallel to the axis of the first rotating shaft 5416. The M second shaft sleeves 544 are fixed on the first support member 53. In a case where the two first rotating arms 5411 rotate, the first tooth structure CJ2 on the first rotating arms 5411 drives the first gear 543 to rotate. The M first gears 543 provided can cause the two first rotating arms 5411 to rotate synchronously.

In some examples, the second support member 52 may be provided as one in number, and the first rotating arm 5411 is connected to the second support member 52. In some other examples, the second support member 52 (referring to FIG. 3) may be provided as two in number, and with continued reference to FIG. 4, one first rotating arm 5411 is connected to one second support member 52. The description in the following continues with the example of the case where the second support member 52 is provided as two in number.

In some examples, referring to FIG. 4, the first rotating assembly 541 further includes: a first curved slideway 5412. The first curved slideway 5412 is located on a second support member 52; for example, the first curved slideway 5412 is fixed on the second support member 52. Referring to FIG. 4, the first rotating arm 5411 has a first sliding portion ZD9, and the first sliding portion ZD9 is slidably provided in the first curved slideway 5412. In this way, the first rotating arm 5411 is connected to the second support member 52 through the first curved slideway 5412, so that the first rotating arm 5411 can drive the second support member 52 to rotate through the first curved slideway 5412. In a case where the first sliding portion ZD9 is in the shape of a cylinder, the center line of the first sliding portion ZD9 is parallel to the axis of the first rotating shaft 5416.

Referring to FIG. 4, the first rotating assembly further includes: a first connecting member 5413. The first connecting member 5413 has a linear slideway (which can be referred to as a first linear slideway HD1); referring to FIG. 5 and FIG. 6, the first rotating arm 5411 has a second sliding portion ZXH2, and the second sliding portion ZXH2 is slidably provided in the first linear slideway HD1. In this way, the first connecting member 5413 can move linearly relative to the first rotating arm 5411, so when the first folding mechanism 54 is in the folded state, the first connecting member 5413 can slide toward a side of the first support member 53. Here, the first connecting member 5413 is fixedly connected to the frame body of the folding display device. Thus, when the first folding mechanism 54 is in the folded state, the frame body can slide to a side of the first support member 53 along with the first connecting member 5413, so that a surface of the frame body proximate to the first support member 53 approaches the first support member 53 (for example, the surface of the frame body proximate to the first support member 53 is parallel to the first support member 53), thereby reducing a gap between the frame body and the first support member 53.

In some examples, referring to FIG. 6, the first rotating portion ZD2 of the first rotating arm 5411 may include a first flat plate PM2 and a first curved plate WQ2 connected to each other, the first curved plate WQ2 is connected to the first installation portion AZ2, and the first flat plate PM2 has a first opening KK2. The first sliding portion ZD9 may be provided as two in number, and the two first sliding portions ZD9 are located on two opposite side walls of the first opening KK2, respectively; the corresponding first curved slideway 5412 may also be provided as two in number, and the first curved slideway 5412 is located in the first opening KK2. In a case where the first linear slideway is provided as two in number, two opposite sides (i.e., two second sliding portions ZXH2) of the first flat plate PM2 slide in the two first linear slideways.

Referring to FIG. 4, the first rotating assembly further includes: a first curved block 545, and the first curved block 545 is fixed on the second support member 52. The first connecting member 5413 has a second curved slideway HX2, and the first curved block 545 is slidably provided in the second curved slideway HX2.

In some embodiments, the first rotating assembly further includes a second connecting member. A first end of the second connecting member is rotatably connected to the first connecting member 5413. For example, the first end of the second connecting member is connected to the first connecting member 5413 through a second fixing shaft, and the first end of the second connecting member rotates around the axis of the second fixing shaft. A rotation axis of the first end of the second connecting member and the first connecting member 5413 is parallel to the axis of the first rotating shaft. For example, the axis of the second fixing shaft is parallel to the axis of the first rotating shaft. A second end of the second connecting member is rotatably connected to the first support member 53. Here, for a rotational connection between the first end of the second connecting member and the first connecting member 5413, please refer to the related description of a rotational connection between a first end of a sixth connecting member and a fifth connecting member below; and for a rotational connection between the second end of the second connecting member and the first support member 53, please refer to the related description of a rotational connection between a second end of the sixth connecting member and the first support member 53 below.

In some examples, the rotation axis of the second end of the second connecting member and the first support member 53 is located between the rotation axes of the first rotating shafts of the two first rotating assemblies. The rotation axis of the second end of the second connecting member and the first support member 53 is parallel to the rotation axes of the first rotating shafts of the two first rotating assemblies. In this way, the rotation axis of the second end of the second connecting member and the first support member is not concentric with the rotation axis of the first rotating arm and the first curved slideway, thus, the first connecting member can slide linearly relative to the first rotating arm.

Figure 7:
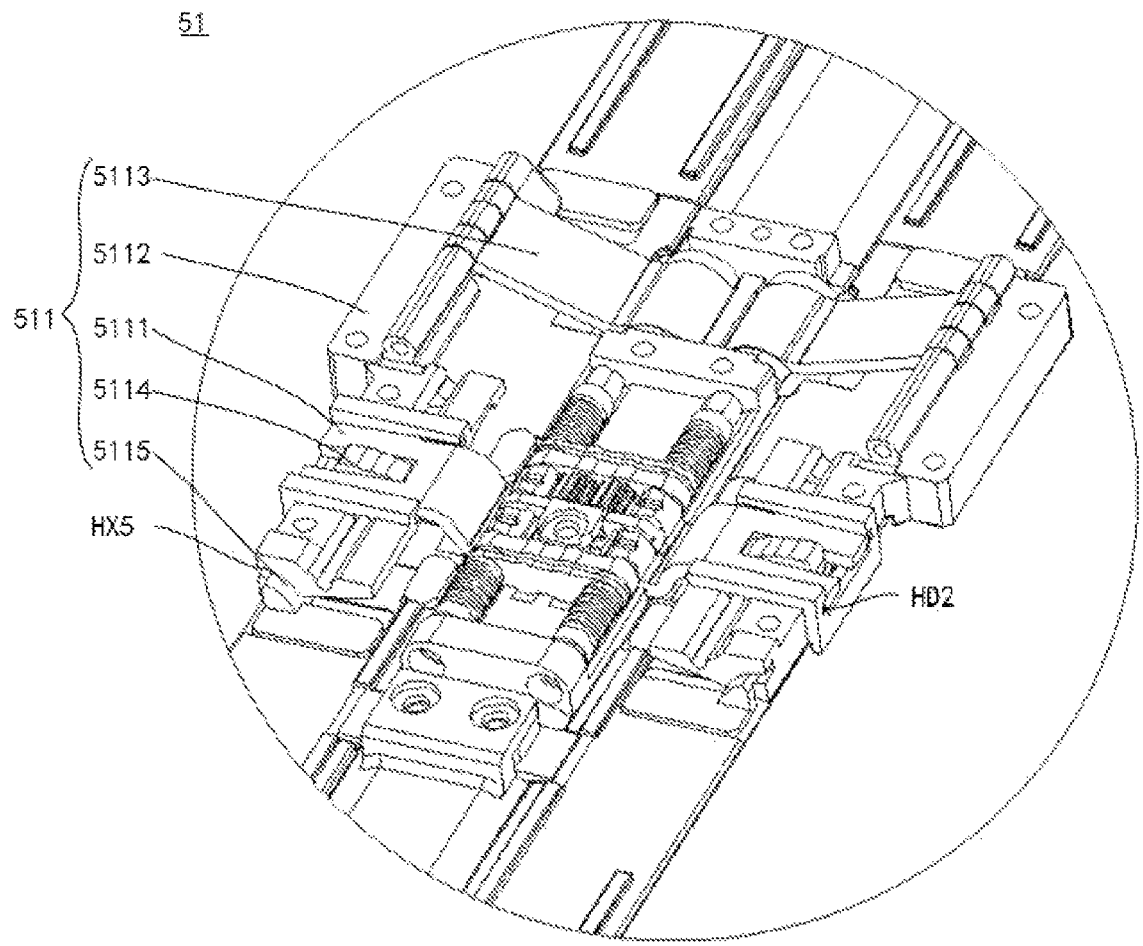
FIG. 7 to FIG. 9 are structural diagrams of a second folding mechanism, in accordance with some embodiments.
Figure 8:
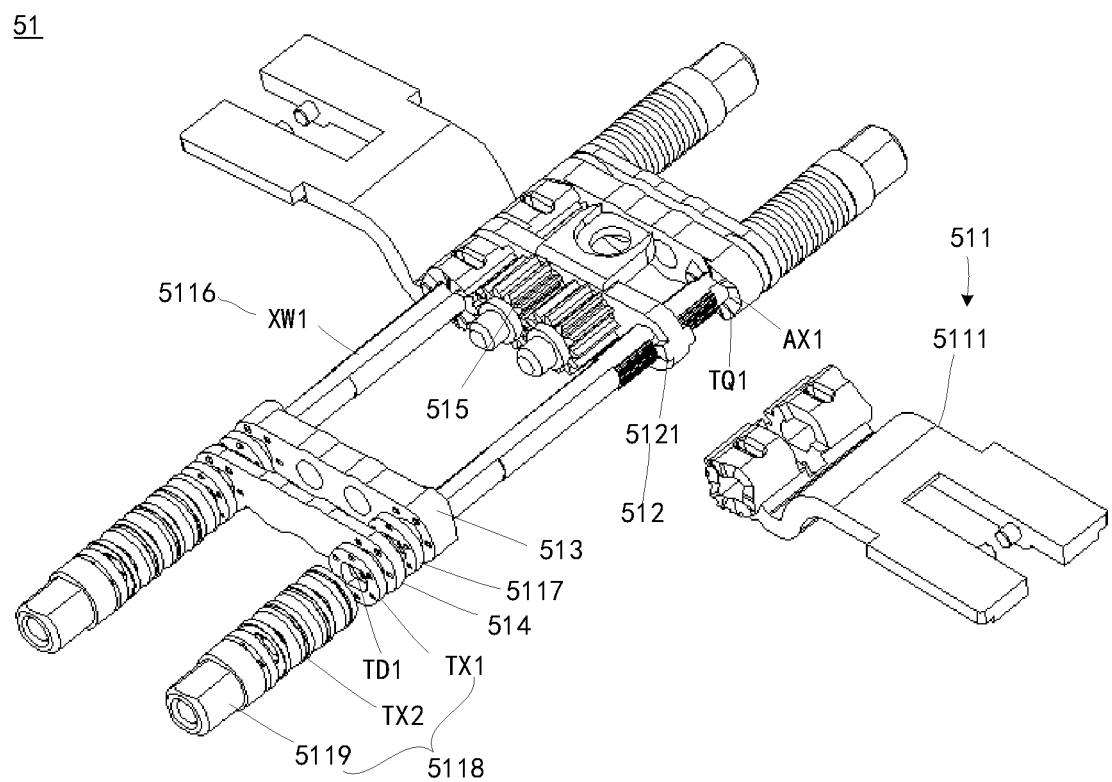
Figure 9:
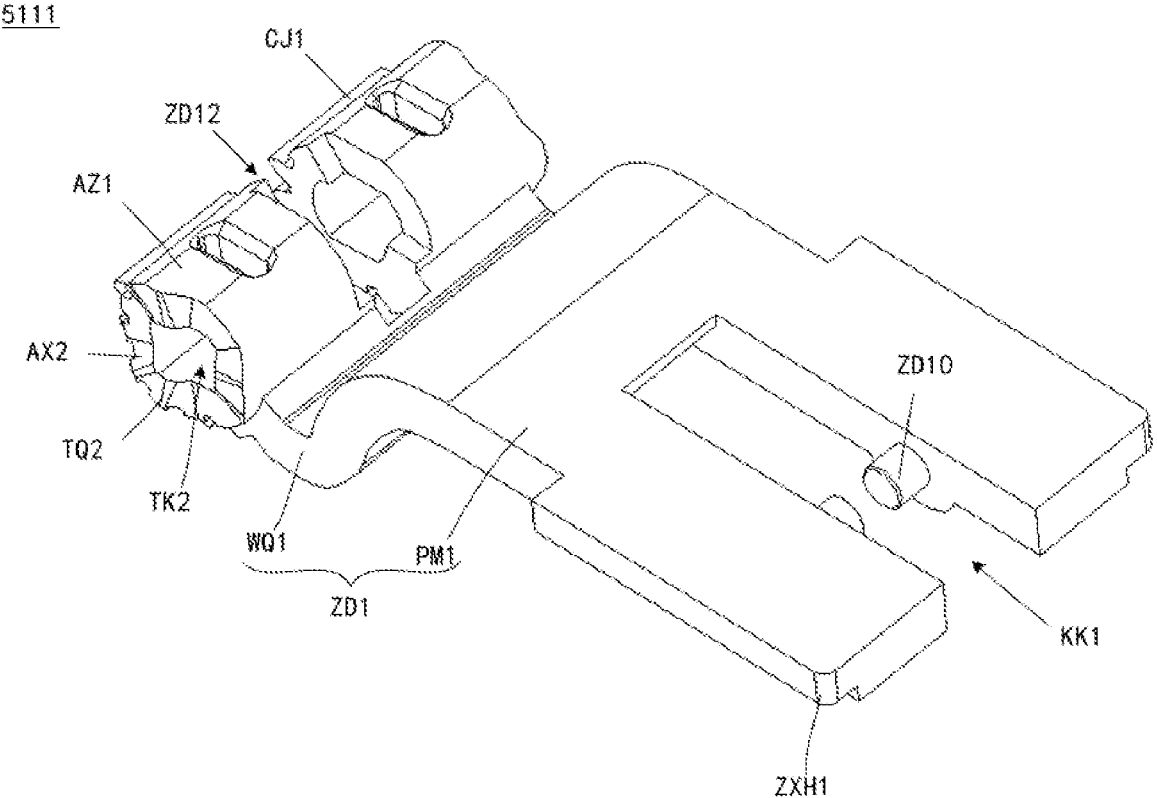

Referring to FIG. 7 to FIG. 9, the second folding mechanism 51 includes two second rotating assemblies 511, and the second rotating assemblies 511 are arranged side by side along the first direction.

The second rotating assembly 511 includes a second rotating shaft 5116, a second rotating arm 5111 and an elastic friction assembly 5118.

The second rotating arm 5111 is sleeved and fixed on the second rotating shaft 5116. In a case where the second rotating arm 5111 rotates, the second rotating arm 5111 will drive the second rotating shaft 5116 to rotate. That is to say, the second rotating arm 5111 and the second rotating shaft 5116 rotate synchronously in the axis of the second rotating shaft 5116. In some examples, referring to FIG. 9, the second rotating arm 5111 includes a second rotating portion ZD1 and at least one (e.g., one or two) second installation portion AZ1 that are connected to each other; the second installation portion AZ1 has a through hole TK2, and the second rotating shaft 5116 is fixed and inserted through the through hole TK2 of the second installation portion AZ1. Here, the axes of through holes TK2 of the two second installation portions AZ1 coincide with each other.

The axis of the second rotating shaft 5116 coincides with the axis of the first rotating shaft 5416, so that the second rotating arm 5111 and the first rotating arm 5411 can rotate synchronously.

The elastic friction assembly 5118 is slidably sleeved on the second rotating shaft 5116. In some examples, referring to FIG. 8, the elastic friction assembly 5118 has a first channel TD1, the second rotating shaft 5116 is inserted through the first channel TD1, and there is a gap between the second rotating shaft 5116 and the first channel TD1 (for example, the second rotating shaft 5116 has a clearance fit with the first channel TD1), so that the elastic friction assembly 5118 can slide relative to the second rotating shaft 5116.

In addition, the elastic friction assembly 5118 is further limited from rotating relative to the second rotating shaft 5116, so that the elastic friction assembly 5118 and the second rotating shaft 5116 rotate synchronously. In some examples, referring to FIG. 8, the second rotating shaft 5116 has a third limiting portion XW1, and the first channel TD1 has a fourth limiting portion. For example, the cross section of the second rotating shaft 5116 and the cross section of the first channel TD1 are both "D" shaped, and the third limiting portion XW1 and the fourth limiting portion may both be flat surfaces. That is, the cross sections of the second rotating shaft 5116 and the first channel TD1 may each be the straight portion in the "D" shape. The third limiting portion XW1 is engaged with the fourth limiting portion. For example, the "D" shaped second rotating shaft 5116 is inserted into the "D" shaped first channel TD1, so as to limit the second rotating shaft 5116 from rotating relative to the elastic friction assembly 5118. In some other examples, the cross section of the second rotating shaft 5116 and the cross section of the first channel TD1 are both in the shape of a regular polygon (such as a quadrilateral, a pentagon, or a hexagon) or an ellipse. For example, the pentagonal second rotating shaft 5116 is sleeved in the pentagonal first channel TD1, thereby limiting the elastic friction assembly 5118 from rotating relative to the second rotating shaft 5116.

In this way, the elastic friction assembly 5118 is on the second rotating shaft 5116, and can slide on the second rotating shaft 5116 along the axial direction of the second rotating shaft 5116; and the elastic friction assembly 5118 rotates synchronously with the second rotating shaft 5116.

Referring to FIG. 8, the second folding mechanism 51 further includes a third connecting member 513. The third connecting member 513 is located between the elastic friction assembly 5118 and the second rotating arm 5111. The third connecting member 513 is slidably sleeved on the second rotating shafts 5116 of the two second rotating assemblies 511. That is to say, the third connecting member 513 is on the second rotating shafts 5116 of the two second rotating assemblies 511, and can slide along the axial direction of the second rotating shafts 5116. In some examples, the third connecting member 513 has two second through holes, the second rotating shafts 5116 of the two second rotating assemblies 511 are respectively inserted through the two second through holes, and the hole diameter of the second through hole is greater than the diameter of the second rotating shaft 5116 (for example, the second rotating shaft 5116 and the second through hole may have a clearance fit), allowing the third connecting member 513 to slide on the second rotating shaft 5116 along the axial direction of the second rotating shaft 5116.

In addition, the second rotating shafts 5116 of the two second rotating assemblies 511 are rotatably sleeved on the third connecting member 513. For example, the second rotating shafts 5116 of the two second rotating assemblies 511 rotate in the two second through holes of the third connecting member 513 respectively.

Referring to FIG. 8, a surface of the third connecting member 513 facing a side where the second rotating arm 5111 is located has a plurality of first protrusions TQ1, and a portion between two first protrusions TQ1 is referred to as a first depression AX1. In some examples, the first protrusion TQ1 may include a first slope surface and a second slope surface. Of an angle of inclination of the first slope surface and an angle of inclination of the second slope surface, one angle is less than 90°, and the other is greater than 90°. That is, of the first slope surface and the second slope surface, one slope surface is an upward slope surface, and the other is an upward slope surface. A connection between the first slope surface and the second slope surface is a first protruding end, and a connection between a first slope surface of a first protrusion TQ1 and a second slope surface of a first protrusion TQ1 adjacent thereto is a first depression AX1.

Referring to FIG. 9, a surface of the second rotating arm 5111 facing a side where third connecting member 513 is located has a plurality of second protrusions TQ2, and a portion between two second protrusions TQ2 is referred to as a second depression AX2. In some examples, the second protrusion TQ2 may include a third slope surface and a fourth slope surface. Of an angle of inclination of the third slope surface and an angle of inclination of the fourth slope surface, one angle is less than 90°, and the other is greater than 90°. That is, of the third slope surface and the fourth slope surface, one slope surface is an upward slope surface, and the other is an upward slope surface. A connection between the third slope surface and the fourth slope surface is a second protruding end, and a connection between a third slope surface of a second protrusion TQ2 and a fourth slope surface of a second protrusion TQ2 adjacent thereto is a second depression AX2.

When the second rotating arm 5111 rotates to the first position, the plurality of first protrusions TQ1 and the plurality of second protrusions TQ2 are staggered from each other. For example, the first protruding end is located in the second depression AX2, and the second protruding end is located in the first depression AX1. Since the second rotating arm 5111 is capable of rotating, when the second rotating arm 5111 rotates to the second position, the plurality of first protrusions TQ1 come into contact with the plurality of second protrusions TQ2. For example, the second protruding end is located on the first slope surface or the second slope surface, and the first protruding end is located on the third slope surface or the fourth slope surface. As another example, the first protruding end and the second protruding end are directly opposite.

In this way, the first rotating arm and the second rotating arm 5111 rotate synchronously, when the second rotating arm 5111 rotates from the first position to the second position, the first protrusion TQ1 and the second protrusion TQ2 change from being staggered from each other to being in contact, and the second rotating arm 5111 is fixedly connected to the second rotating shaft 5116, so that the third connecting member 513 moves in a direction away from the second rotating arm 5111. The third connecting member 513 pushes the elastic friction assembly 5118 to move in the direction away from the second rotating arm 5111, so that the elastic friction assembly 5118 is squeezed to generate rebound force. During this process, the second rotating arm 5111 further drives the second rotating shaft 5116 to rotate, the second rotating shaft 5116 drives the elastic friction assembly 5118 to rotate, and the second rotating shaft 5116 can rotate relative to the third connecting member 513, so that the elastic friction assembly 5118 can rotate relative to the third connecting member 513, so that friction force is generated between the elastic friction assembly 5118 and the third connecting member 513, so that the second folding mechanism 51 generates torsion force.

In some embodiments, referring to FIG. 8, the elastic friction assembly 5118 includes: a locking member 5119, a first friction member TX1 and at least one (e.g., one or multiple) elastic member TX2. The first friction member TX1 is closer to the third connecting member 513 relative to the at least one elastic member TX2. In this way, during a process that the second rotating arm 5111 rotates from the first position to the second position, friction force is generated between the first friction member TX1 and the third connecting member 513, and the elastic member TX2 is squeezed to generate rebound force to keep the first friction member TX1 in contact with the third connecting member 513. In some examples, the first friction member TX1 has a third through hole, and the elastic member TX2 has a fourth through hole. The axes of the third through hole and the fourth through hole coincide with each other to form the first channel TD1. For example, the elastic member TX2 may be a disc spring, a spring, or the like. For example, the first friction member TX1 may be a friction sheet, and the shape of the friction sheet may be circular, rectangular, or the like. The first friction member TX1 has a plurality of oil holes. Adding oil into the oil holes may increase the wear resistance of the first friction member TX1.

The locking member 5119 is fixed on an end of the second rotating shaft 5116 away from the at least one elastic member TX2, thereby preventing the elastic friction assembly 5118 from slipping off the second rotating shaft 5116. For example, the locking member 5119 may be a locking nut, and the locking nut may further play an adjustment role.

In some examples, referring to FIG. 8, the second folding mechanism 51 further includes: a fourth connecting member 514. The fourth connecting member 514 is slidably sleeved on the second rotating shafts 5116 of the two second rotating assemblies 511. That is to say, the fourth connecting member 514 is on the second rotating shafts 5116 of the two second rotating assemblies 511, and can slide along the axial direction of the second rotating shafts 5116. In some examples, the fourth connecting member 514 has two fifth through holes, the second rotating shafts 5116 of the two second rotating assemblies 511 are respectively inserted through the two fifth through holes, and the hole diameter of the fifth through hole is greater than the diameter of the second rotating shaft 5116 (for example, the second rotating shaft 5116 and the fifth through hole may have a clearance fit), allowing the fourth connecting member 514 to slide on the second rotating shaft 5116 along the axial direction of the second rotating shaft 5116. In addition, the second rotating shafts 5116 of the two second rotating assemblies 511 are rotatably sleeved on the fourth connecting member 514. For example, the second rotating shafts 5116 of the two second rotating assemblies 511 respectively rotate in the two fifth through holes of the fourth connecting member 514. The fourth connecting member 514 is located between the third connecting member 513 and the first friction member TX1.

Referring to FIG. 8, the second rotating assembly 511 further includes: a second friction member 5117. The second friction member 5117 is slidably sleeved on the second rotating shaft 5116. In some examples, the second friction member 5117 has a sixth through hole, the second rotating shaft 5116 is inserted through the sixth through hole, and there is a gap between the second rotating shaft 5116 and the sixth through hole (for example, the second rotating shaft 5116 and the sixth through hole have a clearance fit), so that the second friction member 5117 can slide relative to the second rotating shaft 5116. In addition, the second friction member 5117 is further limited from rotating relative to the second rotating shaft 5116, so that the second friction member 5117 and the second rotating shaft 5116 rotate synchronously. In some examples, the cross section of the sixth through hole is "D" shaped, and the "D" shaped second rotating shaft 5116 is inserted through the "D" shaped sixth through hole to limit rotation of the second rotating shaft 5116 relative to the elastic friction assembly 5118. In this way, the second friction member 5117 is on the second rotating shaft 5116, and can slide on the second rotating shaft 5116 along the axial direction of the second rotating shaft 5116; and the second friction member 5117 and the second rotating shaft 5116 rotate synchronously.

The second friction member 5117 is located between the third connecting member 513 and the fourth connecting member 514. That is, along the axial direction of the second rotating shaft 5116, the third connecting member 513, the second friction member 5117, the fourth connecting member 514, the first friction member TX1, the elastic member TX2 and the locking member 5119 are arranged in sequence. In this way, friction force can be generated between the first friction member TX1 and the fourth connecting member 514, friction force can be generated between the second friction member 5117 and the third connecting member 513, and friction force can be generated between the second friction member 5117 and the fourth connecting member 514, thereby increasing the friction force of the second folding mechanism 51, and increasing the torsion force of the second folding mechanism 51.

In some examples, in each second rotating assembly 511, the second rotating shaft 5116 is provided through the through hole TK2 of the second installation portion AZ1. That is to say, the second rotating shaft 5116 extends on both sides of the second installation portion AZ1. Here, extended portions of the second rotating shaft 5116 located on both sides of the second installation portion AZ1 each is provided thereon with a third connecting member 513, a second friction member 5117, a fourth connecting member 514, a first friction member TX1, an elastic member TX2 and a locking member 5119, and respective structures on the extended portions on both sides are symmetrically arranged. In this way, the friction force of the second folding mechanism 51 may be increased, thereby increasing the torsion force of the second folding mechanism 51. Here, first friction members TX1 located on both sides of the second installation portion may have the same or different number.

In some embodiments, with continued reference to FIG. 7 to FIG. 9, the second folding assembly 51 further includes a fixing member 512. The fixing member 512 is rotatably sleeved on the second rotating shafts 5116 of the two second rotating assemblies 511. For example, the fixing member 512 has two seventh through holes, and the hole diameter of the seventh through hole is greater than the diameter of the second rotating shaft 5116 (for example, the seventh through hole has a clearance fit with the second rotating shaft 5116). The second rotating shafts 5116 of the two second rotating assemblies 511 are inserted through the two seventh through holes of the fixing member 512. In some examples, in a case there are two second installation portions AZ1, the fixing member 512 is located between the two second installation portions AZ1. The fixing member 512 is fixedly connected to the first support member 53, for example, using bolts, buckles, etc. to fix the fixing member 512 to the first support member 53.

Referring to FIG. 9, the second rotating arm 5111 has a third curved slideway ZD12. For example, in the case there are two second installation portions AZ1, the third curved slideway ZD12 may be formed between the two second installation portions AZ1. Referring to FIG. 8, the fixing member 512 has a third sliding portion 5121, and the third sliding portion 5121 is slidably provided in the third curved slideway ZD12. In a case where the second rotating arm 5111 rotates, the third sliding portion 5121 can slide in the third curved slideway ZD12. When the third sliding portion 5121 is in contact with a first limiting end of the third curved slideway ZD12, the second folding mechanism 51 is in the first position; and when the third sliding portion 5121 is in contact with a second limiting end of the third curved slideway ZD12, the second folding mechanism 51 is in the second position. Here, the first limiting end and the second limiting end of the third curved slideway ZD12 are two distal positions of the third curved slideway ZD12. That is to say, the third sliding portion 5121 only slide between the first limiting end and the second limiting end of the third curved slideway ZD12.

With continued reference to FIG. 7 to FIG. 9, the second rotating arm 5111 has a second tooth structure CJ1; the second tooth structure CJ1 is composed of a plurality of gear teeth. The second folding mechanism 51 further includes: N second gears 515 meshed in sequence, where N is an even number greater than or equal to 2; for example, N is equal to 2. The N second gears 515 are meshed between second tooth structures CJ1 of the two second rotating arms 5111. For example, among the N second gears 515, the second gear 515 closest to a second rotating arm 5111 is meshed with a second tooth structure CJ1 of the second rotating arm 5111. The N second gears 515 are rotatably installed on the third connecting member 513 and the fixing member 512. For example, a second gear 515 is coaxially fixed on a fourth fixing shaft, and both ends of the fourth fixing shaft are rotatably arranged in an eighth through hole of the third connecting member 513 and a ninth through hole of the fixing member 512, respectively. The rotation axis of the N second gears 515 is parallel to the axis of the second rotating shaft 5116; for example, the axis of the fourth fixing shaft is parallel to the axis of the second rotating shaft 5116. In a case where the two second rotating arms 5111 rotate, the second tooth structure CJ1 on the second rotating arms 5111 drives the second gear 515 to rotate. The N second gears 515 provided can cause the two second rotating arms 5111 to rotate synchronously.

In some embodiments, with continued reference to FIG. 7 to FIG. 9, in a case where there are two second support members 52, a second rotating arm 5111 is connected to a second support member 52. In some examples, the second rotating assembly 511 further includes: a fourth curved slideway 5114 and a fifth connecting member 5112. The fourth curved slideway 5114 is located on the second support member 52; for example, the fourth curved slideway 5114 is fixed on the second support member 52. The second rotating arm 5111 has a fourth sliding portion ZD10, and the fourth sliding portion ZD10 is slidably provided in the fourth curved slideway 5114. The fifth connecting member 5112 has a second linear slideway HD2; the second rotating arm 5111 has a fifth sliding portion ZXH1, and the fifth sliding portion ZXH1 is slidably provided in the second linear slideway HD2. In a case where the fourth sliding portion ZD10 is in the shape of a cylinder, the center line of the fourth sliding portion ZD10 is parallel to the axis of the second rotating shaft 5116. For the description of the connection between the second rotating arm 5111 and a second support member 52, please refer to the related description of the connection between the first rotating arm 5411 and a second support member 52.

Referring to FIG. 7, the second rotating assembly 511 further includes: a second curved block 5115, and the second curved block 5115 is fixed on the second support member 52. The fifth connecting member 5112 has a fifth curved slideway HX5, and the second curved block 5115 is slidably provided in the fifth curved slideway HX5.

In some embodiments, referring to FIG. 7, the second rotating assembly 511 further includes a sixth connecting member 5113. A first end of the sixth connecting member 5113 is rotatably connected to the fifth connecting member 5112. For example, the first end of the sixth connecting member 5113 is connected to the fifth connecting member 5112 through a fifth fixing shaft, and the first end of the sixth connecting member 5113 rotates centered on the axis of the fifth fixing shaft. The rotation axis of the first end of the sixth connecting member 5113 and the fifth connecting member 5112 is parallel to the axis of the second rotating shaft 5116. For example, the axis of the fifth fixing shaft is parallel to the axis of the second rotating shaft 5116. A second end of the sixth connecting member 5113 is rotatably connected to the first support member 53. For example, the first support member 53 has a first hollowed-out portion, a semi-cylindrical third fixing shaft is provided on the first support member 53, and the third fixing shaft is located in the first hollowed-out portion. The second end of the sixth connecting member 5113 is semi-cylindrical, and the second end of the sixth connecting member 5113 is buckled on the third fixing shaft to realize a rotatable connect of the second end of the sixth connecting member 5113 and the first support member 53. A fixing cover is used to be installed on the first support member 53, and the fixing cover is directly opposite to the first hollowed-out portion, thereby limiting the second end of the sixth connecting member 5113 between the fixing cover and the third fixing shaft. In some examples, the rotation axis of the second end of the sixth connecting member 5113 and the first support member 53 is located between the rotation axes of the second rotating shafts 5116 of the two second rotating assemblies 511. The rotation axis of the second end of the sixth connecting member 5113 and the first support member 53 is parallel to the rotation axes of the second rotating shafts 5116 of the two second rotating assemblies 511.

Figure 10:
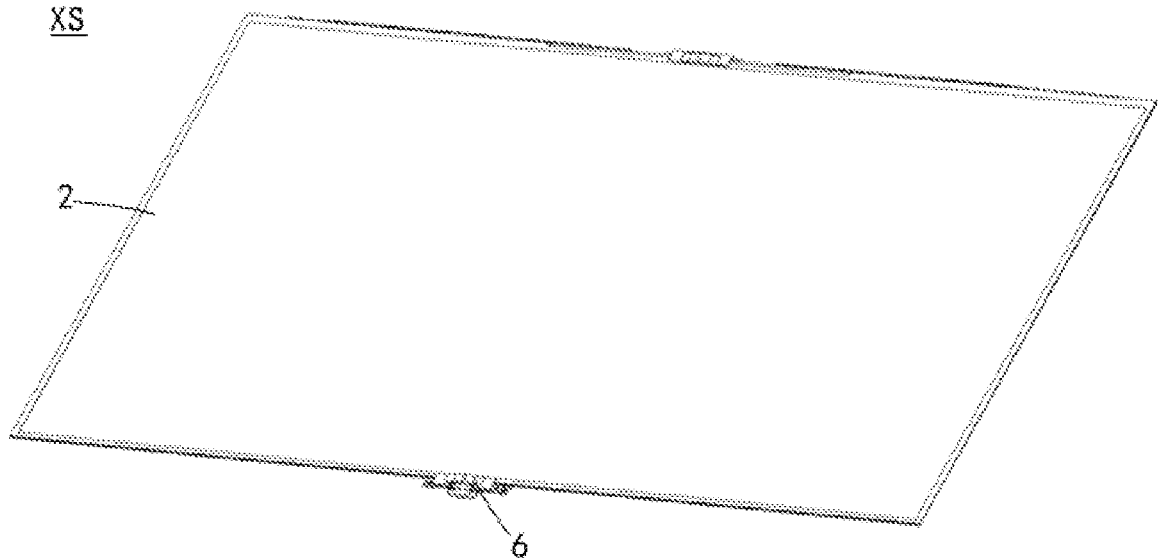
FIG. 10 is a structural diagram of a flexible screen and a connecting assembly, in accordance with some embodiments.
Figure 11:
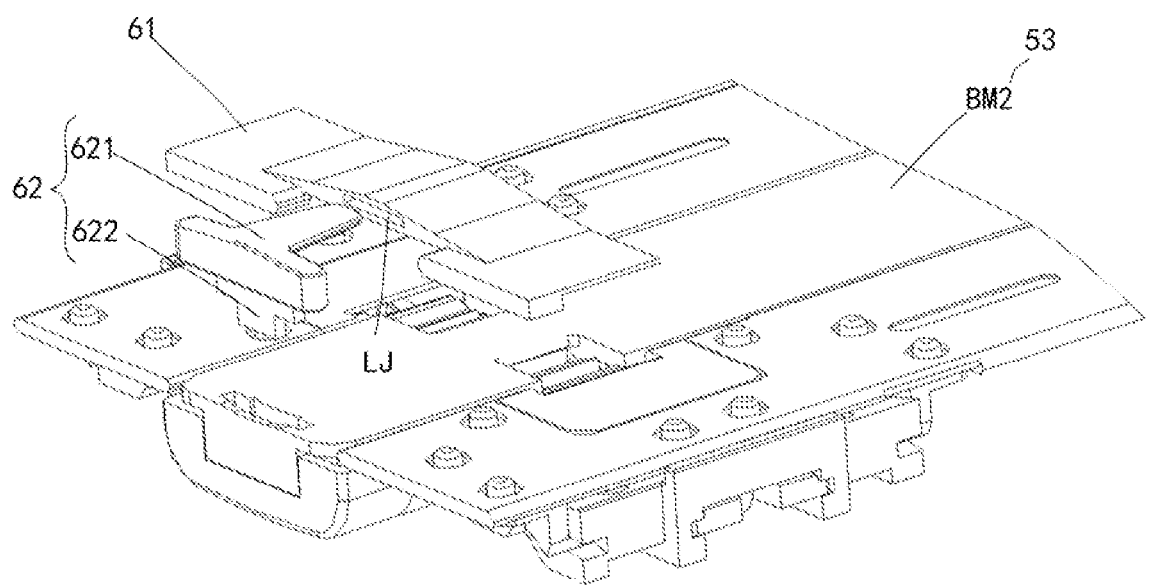
FIG. 11 is a structural diagram of a connecting assembly and a folding mechanism, in accordance with some embodiments.

Embodiments of the present disclosure provide the folding display device XS, referring to FIG. 10 and FIG. 11, the folding display device XS further includes a connecting assembly 6, and the folding mechanism is located on a back surface of the flexible screen 2. The connecting assembly 6 connects the flexible screen 2 to the folding mechanism.

In some examples, the connecting assembly 6 includes: a flexible fixing member 61 and a fastening member 62. The flexible fixing member 61 is located on a front surface of the flexible screen 2. For example, the flexible fixing member 61 is in contact with the frame of the flexible screen 2 and is not in contact with a display area of the flexible screen 2. The flexible fixing member 61 is located at an end of the folding axis of the flexible screen 2 and crosses the folding axis. The folding axis of the flexible screen 2 is directly opposite to the first support member (for example, directly opposite to the center line of the first support member 53). A portion of the flexible fixing member 61 opposite to the folding axis is provided with a fixing portion LJ. For example, the fixing portion LJ may be a connecting hole. The connecting hole LJ is directly opposite to the first support member 53 (for example, the center line of the connecting hole LJ is directly opposite to the center line of the first support member 53). The fastening member 62 includes a first connecting portion 621 and a second connecting portion 622 connected to each other. The first connecting portion 621 is connected to the fixing portion LJ. For example, the first connecting portion 621 is inserted into the connecting hole, thereby preventing a portion of the flexible member 61 directly opposite to the first support member from arching. The second connecting portion 622 is fixedly connected to the first support member 53 of the folding mechanism. For example, from the second surface BM2 of the first support member, the second connecting portion 622 is inserted into the groove of the first support member 53, and is stuck with adhesive. The material of the flexible fixing portion 61 is an impact-resistant flexible material, such as rubber (for example, thermoplastic polyurethane rubber). The first connecting portion 621 and the second connecting portion 622 may be integrally provided. The material of the first connecting portion 621 and the second connecting portion 622 may be a metal material, such as aluminum, iron, or the like.

In some examples, the flexible fixing portion 61 and the flexible screen 2 have a gap of 0.2 mm to 0.5 mm therebetween (such as 0.2 mm, 0.3 mm, 0.4 mm, 0.5 mm, or the like). This gap can prevent the flexible fixing portion 61 from crushing the flexible screen 2. For example, cushioning foam may be filled in the gap to reduce the shaking of the flexible screen 2.

The foregoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A folding mechanism, comprising:
   a first support member;
   a first rotating assembly, including a first rotating shaft and a first rotating arm, the first rotating arm being sleeved and fixed on the first rotating shaft; and
   a first shaft sleeve, fixed on the first support member, wherein the first shaft sleeve has a first slit, and the first slit runs through an inner surface of the first shaft sleeve and an outer surface of the first shaft sleeve and runs through both ends of the first shaft sleeve along a direction parallel to an axis of the first rotating shaft; and the inner surface of the first shaft sleeve has a second limiting portion, and the second limiting portion and the first slit are arranged spaced apart along a circumferential direction of the first shaft sleeve;
   wherein an outer circumferential surface of the first rotating shaft has a first limiting portion, and the first limiting portion is used to: be engaged with the second limiting portion in a case of rotating to a first position, and be engaged with an inner end of the first slit in a case of rotating to a second position.

2. The folding mechanism according to claim 1, wherein the first rotating assembly is provided as two in number, and the two first rotating assemblies are arranged side by side along a first direction; and the first shaft sleeve is provided as two in number, and the two first shaft sleeves are arranged side by side along the first direction; wherein the first direction intersects the axis of the first rotating shaft.

3. The folding mechanism according to claim 2, wherein the first rotating arm has two first rotating arms in the two first rotation assemblies each have a first tooth structure; and
   the folding mechanism further comprises M second shaft sleeves and M first gears meshed in sequence; the M first gears are meshed between first tooth structures of the two first rotating arms, and are rotatably sleeved in the M second shaft sleeves; and the M second shaft sleeves are fixed on the first support member; wherein M is an even number greater than or equal to 2.

4. The folding mechanism according to claim 1, wherein the folding mechanism further comprises: a second support member, located on a side of the first support member along a first direction, the first direction intersecting the axis of the first rotating shaft; and the second support member is connected to the first rotating arm; and
   the first rotating assembly further includes: a first curved slideway and a first connecting member, the first curved slideway is located on the second support member; the first rotating arm has a first sliding portion, and the first sliding portion is slidably provided in the first curved slideway; the first connecting member has a linear slideway; and the first rotating arm further has a second sliding portion, and the second sliding portion is slidably provided in the linear slideway.

5. The folding mechanism according to claim 4, wherein the first rotating assembly further includes:
   a first curved block, fixed on the second support member, wherein the first connecting member further has a second curved slideway, and the first curved block is slidably provided in the second curved slideway.

6. The folding mechanism according to claim 1, wherein the first rotating assembly further includes:
   a second connecting member, a first end of the second connecting member being rotatably connected to the first connecting member, and a second end of the second connecting member being rotatably connected to the first support member.

7. The folding mechanism according to claim 6, wherein a rotation axis of the second end of the second connecting member and the first support member is parallel to the axis of the first rotating shaft of the first rotating assembly.

8. The folding mechanism according to claim 1, wherein the folding mechanism further comprises: two second rotating assemblies, arranged side by side along a first direction, the first direction intersecting the axis of the first rotating shaft; each second rotating assembly includes a second rotating shaft, a second rotating arm, and an elastic friction assembly, wherein the second rotating arm is sleeved and fixed on the second rotating shaft, the elastic friction assembly is slidably sleeved on the second rotating shaft, and the axis of the first rotating shaft coincides with an axis of the second rotating shaft; and the folding mechanism further comprises a third connecting member, wherein the third connecting member is slidably sleeved on second rotating shafts of the two second rotating assemblies, and located between the elastic friction assembly and the second rotating arm; a surface of the third connecting member facing a side where the second rotating arm is located has first protrusions, and a surface of the second rotating arm facing a side where the third connecting member is located has second protrusions;

wherein the first rotating arm and the second rotating arm are configured to rotate synchronously; in a case where the first rotating arm and the second rotating arm rotate to the first position, the first protrusions are staggered from the second protrusions; and in a case where the first rotating arm and the second rotating arm rotate to the second position, the first protrusions are in contact with the second protrusions to push the third connecting member to compress the elastic friction assembly.

9. The folding mechanism according to claim 8, wherein the second rotating shaft has a third limiting portion; the elastic friction assembly has a first channel, and the first channel has a fourth limiting portion; the third limiting portion is engaged with the fourth limiting portion to limit a relative rotation of the second rotating shaft to the elastic friction assembly.

10. The folding mechanism according to claim 8, wherein the elastic friction assembly includes: a locking member, a first friction member and at least one elastic member, wherein the first friction member is closer to the third connecting member relative to the at least one elastic member, and the locking member is fixed on an end of the second rotating shaft away from the at least one elastic member.

11. The folding mechanism according to claim 10, wherein
the folding mechanism further comprises: a fourth connecting member, wherein the fourth connecting member is rotatably sleeved on the second rotating shafts of the two second rotating assemblies, and is located between the third connecting member and the first friction member; and
the second rotating assembly further includes: a second friction member, wherein the second friction member is sleeved and fixed on the second rotating shaft, and located between the third connecting member and the fourth connecting member.

12. The folding mechanism according to claim 8, wherein the folding mechanism further comprises: a fixing member, rotatably sleeved on the second rotating shafts of the two second rotating assemblies and fixedly connected to the first support member, wherein the fixing member has a third sliding portion, the second rotating arm has a third curved slideway, and the third sliding portion is slidably provided in the third curved slideway.

13. The folding mechanism according to claim 12, wherein
the second rotating arm further has a second tooth structure; and
the folding mechanism further comprises: N second gears meshed in sequence, and the N second gears are meshed between second tooth structures of two second rotating arms, and rotatably installed on the third connecting member and the fixing member, wherein N is an even number greater than or equal to 2.

14. The folding mechanism according to claim 8, wherein the second rotating arm includes a second rotating portion and at least one second installation portion, the second rotating portion is connected to the at least one second installation portions; and
each second installation portion has a through hole, and the second rotating shaft is fixed and inserted through the through hole.

15. A folding display device, comprising:
a flexible screen;
the folding mechanism according to claim 1, located on a back surface of the flexible screen; and
a connecting assembly, connecting the flexible screen to the folding mechanism.

16. The folding display device according to claim 15, wherein the connecting assembly includes:
a flexible fixing member, located on a front surface of the flexible screen, wherein the flexible fixing member is located at an end of a folding axis of the flexible screen, and crosses the folding axis; and a portion of the flexible fixing member opposite to the folding axis is provided with a fixing portion; and
a fastening member, including a first connecting portion and a second connecting portion connected to each other, wherein the first connecting portion is connected to the fixing portion, and the second connecting portion is connected to the first support member of the folding mechanism.

17. The folding mechanism according to claim 1, wherein the first limiting portion and the second limiting portion are both flat surface.

18. A folding mechanism, comprising:
a first support member;
two second rotating assemblies, arranged side by side along a first direction; each second rotating assembly including a second rotating shaft, a second rotating arm, and an elastic friction assembly, wherein the second rotating arm is sleeved and fixed on the second rotating shaft, the elastic friction assembly is slidably sleeved on the second rotating shaft, and the first direction intersects an axis of the second rotating shaft; and
a third connecting member, wherein the third connecting member is slidably sleeved on second rotating shafts of the two second rotating assemblies, and located between the elastic friction assembly and the second rotating arm; a surface of the third connecting member facing a side where the second rotating arm is located has first protrusions, and a surface of the second rotating arm facing a side where the third connecting member is located has second protrusions;

wherein the first rotating arm and the second rotating arm are configured to rotate synchronously; in a case where the first rotating arm and the second rotating arm rotate to a first position, the first protrusions are staggered from the second protrusions; and in a case where the first rotating arm and the second rotating arm rotate to a second position, the first protrusions are in contact with the second protrusions to push the third connecting member to compress the elastic friction assembly.

19. A folding display device, comprising:

a flexible screen;

the mechanism according to claim 18, located on a back surface of the flexible screen; and a connecting assembly, connecting the flexible screen to the folding mechanism.

20. The folding display device according to claim 19, wherein the connecting assembly includes:

a flexible fixing member, located on a front surface of the flexible screen, wherein the flexible fixing member is located at an end of a folding axis of the flexible screen, and crosses the folding axis; and a portion of the flexible fixing member opposite to the folding axis is provided with a fixing portion; and a fastening member, including a first connecting portion and a second connecting portion connected to each other, wherein the first connecting portion is connected to the fixing portion, and the second connecting portion is connected to the first support member of the folding mechanism.

* * * * *